United States Patent [19]
Wolff

[11] Patent Number: 5,726,755
[45] Date of Patent: Mar. 10, 1998

[54] METHOD AND APPARATUS FOR VIEWING

[76] Inventor: Lawrence B. Wolff, 1 E. University Pkwy., Baltimore, Md. 21218

[21] Appl. No.: 696,022

[22] Filed: Aug. 9, 1996

Related U.S. Application Data

[63] Continuation of Ser. No. 337,270, Nov. 10, 1994, abandoned.
[51] Int. Cl.⁶ ............................. G01J 4/00; H04W 7/18; H04W 9/47
[52] U.S. Cl. .................. 356/364; 356/366; 356/367; 356/368; 348/135; 348/142
[58] Field of Search ................. 356/364, 366–368; 348/135, 142

[56] References Cited

U.S. PATENT DOCUMENTS

| | | | |
|---|---|---|---|
| 3,016,789 | 1/1962 | Keston | 356/368 |
| 3,230,820 | 1/1966 | Wisnieff | 356/368 |
| 3,391,599 | 7/1968 | Fleisher et al. | 356/368 |
| 3,445,826 | 5/1969 | Myers | 356/368 |
| 3,445,833 | 5/1969 | Lins | 356/368 |
| 4,333,008 | 6/1982 | Misek | 356/364 |
| 4,375,317 | 3/1983 | Funada et al. | 359/53 |
| 4,423,927 | 1/1984 | Bly | 359/53 |
| 5,028,138 | 7/1991 | Wolff | 356/364 |
| 5,264,916 | 11/1993 | Bushman | 356/364 |
| 5,345,308 | 9/1994 | Bushman | 356/364 |
| 5,396,329 | 3/1995 | Kalawsky | 356/367 |
| 5,404,225 | 4/1995 | Bushman | 356/364 |
| 5,543,866 | 8/1996 | Van de Velde | 351/221 |

Primary Examiner—Frank G. Font
Assistant Examiner—Jason D. Vierra-Eisenberg
Attorney, Agent, or Firm—Ansel M. Schwartz

[57] ABSTRACT

An apparatus comprising an optical filter which resolves electromagnetic radiation into a sequence of resolved polarization components. The apparatus is also comprised of an imaging device having a storage device. The imaging device is disposed adjacent to the optical filter to receive the sequence of resolved polarization components from the optical filter and store them in the storage device for subsequent processing. The present invention pertains to an apparatus for viewing. The apparatus comprises a frame. The apparatus also is comprised of a first optical filter mounted on the frame to cover one eye of a viewer when the viewer wears the frame. The first optical filter resolves electromagnetic radiation into a sequence of resolved polarization components so the viewer can view the sequence of resolved polarization components. The present invention also pertains to an apparatus for viewing. The apparatus is comprised of a housing. The apparatus also includes at least a first lens disposed in the housing through which a viewer looks to aid vision of the viewer. The apparatus is also comprised of a first optical filter attached to the housing and adjacent the lens so light passing through the lens essentially passes through the first optical filter. The first optical filter resolves electromagnetic radiation into a sequence of resolved polarization components so the viewer can view the sequence of resolved polarization components. The present invention also pertains to a method for interpreting a scene.

41 Claims, 3 Drawing Sheets

METHOD AND APPARATUS FOR VIEWING

This application is a continuation of application Ser. No. 08/337,270 filed on Nov. 10, 1994 now abandoned.

FIELD OF THE INVENTION

The present invention is related to a method and apparatus for viewing. More specifically, the present invention is related to a method and apparatus for viewing the polarization properties of a scene.

BACKGROUND OF THE INVENTION

Light normally viewed by the human eye reveals colors and objects as well as their locations. Light allows us to cross a field as well as to read a book. However, in certain circumstances, the same light can actually fool the human eye. For instance, light reflected from a mirror could reveal an object that is actually located in another location. Or, an object which is camouflaged to blend in with its surroundings cannot be easily distinguished for what it is.

By taking this light and identifying certain components, for instance, polarization components, information otherwise not available to the human eye can be obtained. This polarization information can be viewed directly by the human eye with the apparatus of the present invention, or it can be stored in a camera of the present invention. At a later time, the images stored in the camera can be processed and be displayed at a later time.

SUMMARY OF THE INVENTION

The apparatus is comprised of an optical filter which resolves electromagnetic radiation into a sequence of resolved polarization components. The apparatus is also comprised of an imaging device having a storage device. The imaging device is disposed adjacent to the optical filter to receive the sequence of resolved polarization components from the optical filter and store them in the storage device for subsequent processing.

The present invention pertains to an apparatus for viewing. The apparatus comprises a frame. The apparatus also is comprised of a first optical filter mounted on the frame to cover one eye of a viewer when the viewer wears the frame. The first optical filter resolves electromagnetic radiation into a sequence of resolved polarization components so the viewer can view the sequence of resolved polarization components.

The present invention also pertains to an apparatus for viewing. The apparatus is comprised of a housing. The apparatus also includes at least a first lens disposed in the housing through which a viewer looks to aid vision of the viewer. The apparatus is also comprised of a first optical filter attached to the housing and adjacent the lens so light passing through the lens essentially passes through the first optical filter. The first optical filter resolves electromagnetic radiation into a sequence of resolved polarization components so the viewer can view the sequence of resolved polarization components.

The present invention also pertains to a method for interpreting a scene. The method comprises the steps of resolving electromagnetic radiation of the scene into a sequence of resolved polarization components so elements of the scene having partial polarization will scintillate when the sequence of resolved polarization components are viewed. Then there is the step of viewing the sequence of polarization components.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 2:
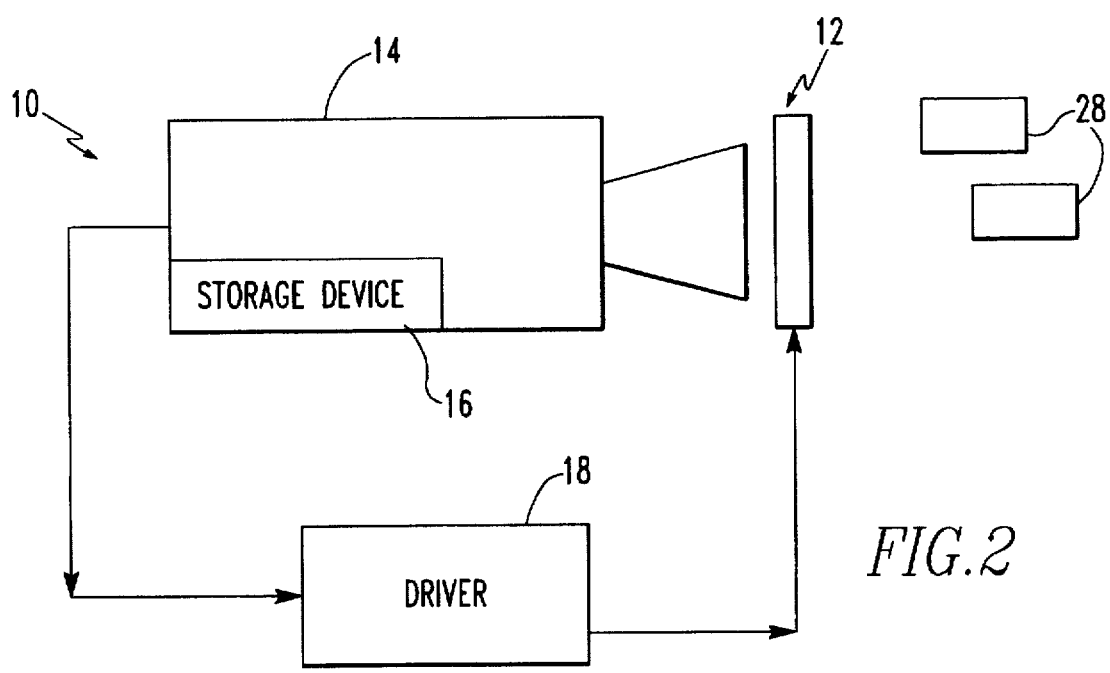
FIG. 2 is a schematic representation of an apparatus for viewing a scene of the present invention.
Figure 5:
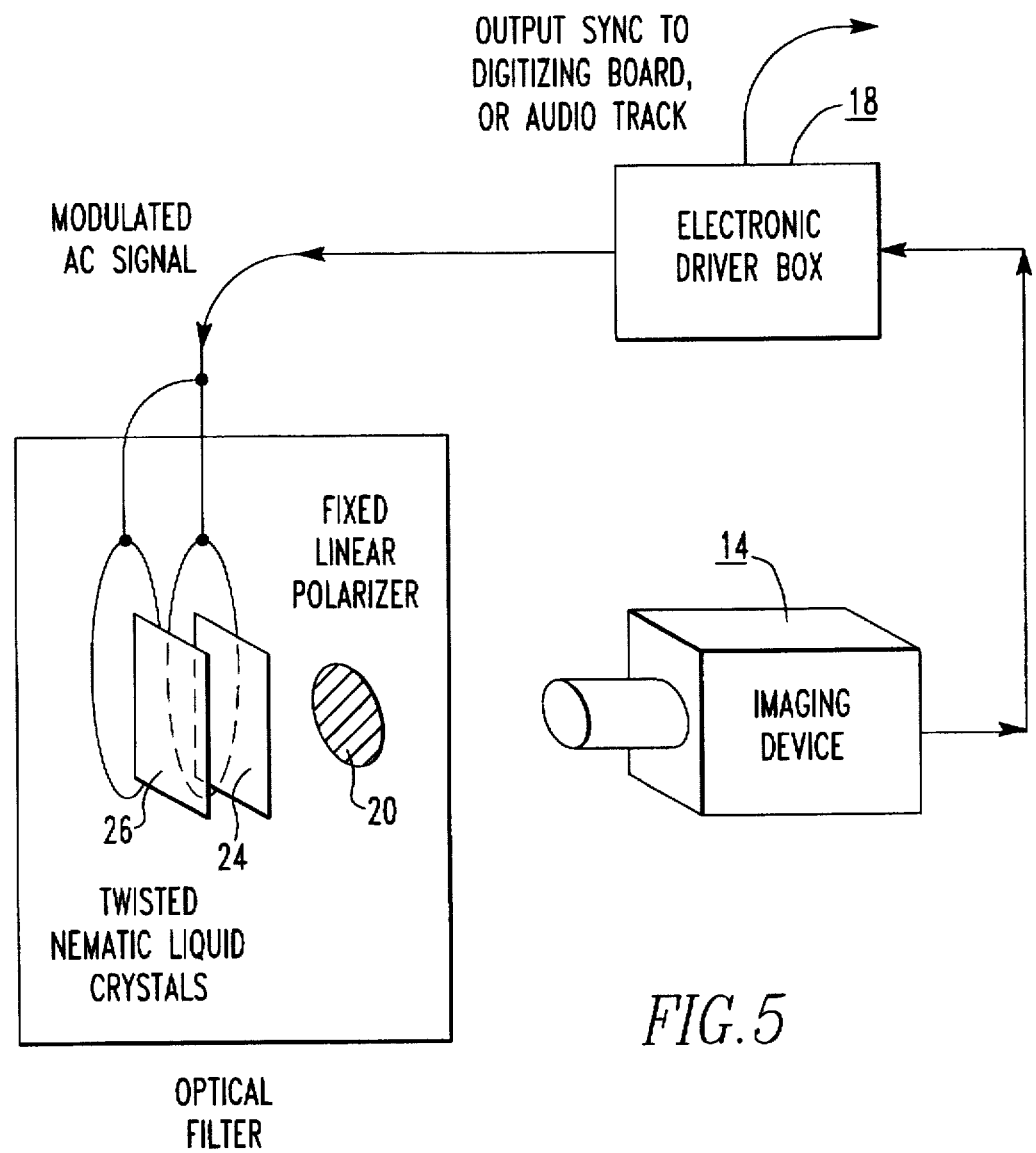
FIG. 5 is a schematic representation of an alternative embodiment of the present invention.

Referring now to the drawings wherein like reference numerals refer to similar or identical parts throughout the several views, and more specifically to FIG. 2 and FIG. 5 thereof, there is shown an apparatus 10 for viewing a scene. The apparatus 10 is comprised of an optical filter 12 which resolves electromagnetic radiation into a sequence of resolved polarization components. The apparatus 10 is also comprised of an imaging device 14 having a storage device 16. The imaging device 14 is disposed adjacent to the optical filter 12 to receive the sequence of resolved polarization components from the optical filter 12 and store them in the storage device 16 for subsequent processing. The imaging device 14 preferably measures polarization states of the sequence of resolved polarization components and stores the measured polarization states to form the images.

For instance, the imaging device 14 can be a camcorder and the storage device 16 can be a videotape in the camcorder. Alternatively, the imaging device 14 can be a still video camera and the storage device 16 can be an internal memory or a disk.

The imaging device 14 preferably produces a video synchronization signal. The apparatus 10 preferably also includes a driver 18 connected to the imaging device 14 in the optical filter 12. The driver 18 receives the video synchronization signal and produces a filter synchronization signal which is provided to the optical filter 12. The filter synchronization signal causes the optical filter 12 to produce the sequence of resolved polarization components so the optical filter 12 is in synchronization with the imaging device 14 so images are stored by the imaging device 14 at a proper time.

The optical filter 12 preferably comprises a polarizer 20. The polarizer 20 can be a fixed linear polarizer. The optical filter 12 preferably also includes a mechanism 22 for steering a polarization plane of the radiation. The steering mechanism 22 is disposed such that radiation passing through the polarizer 20 first passes through the steering mechanism 22.

Preferably, the steering mechanism 22 includes a first twist crystal 24 and at least a second twist crystal 26 aligned with the first twist crystal 24 such that radiation passing through the first crystal 24 then passes through the second crystal 26. Each crystal 24, 26 has a first state and a second state. The first state does not effect the polarization plane of the radiation as the radiation passes through the crystal. The second state rotates the polarization plane of the radiation as the radiation passes through the crystal. Preferably, the driver 18 controls the state of each crystal in conjunction with the imaging device 14. Preferably, each second state rotates the polarization plane of radiation passing through the first or second crystal 45°. Preferably, the driver 18 controls the states of the crystals such that the polarization plane of radiation over time passing through the crystals experiences sequential rotation of 0°, 45°, 90° and 135° to create the sequence of resolved polarization components. Preferably, the driver 18 maintains the crystals at a given state for four frame times of the imaging device 14 such that the rotation of the polarization plane experiences the rotation of 0°, 45°, 90° and 135° as the state of the crystals are changed. The driver 18 preferably modulates an AC voltage based on the video synchronization signal to produce the filter synchronization signal. The driver 18 modulates an AC voltage to produce the filter synchronization signal that maintains the crystals at a given state for time durations that are multiples of a basic video frame rate of the imaging device 14.

The apparatus 10 can also include preformed polarized objects 28 disposed in the scene which scintillate when an image from the sequence of resolved polarization components is formed.

Figure 3:
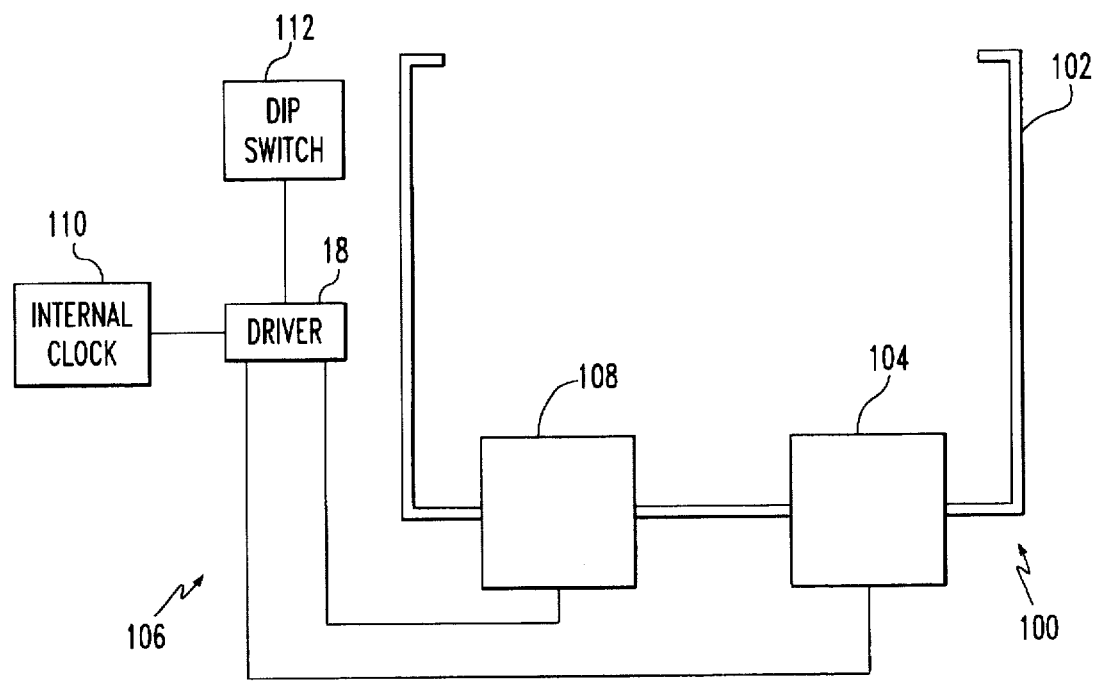
FIG. 3 is a schematic representation showing glasses of the present invention.

The present invention as shown in FIG. 3 pertains to an apparatus 100 for viewing. The apparatus 100 comprises a frame 102. The apparatus 100 also is comprised of a first optical filter 104 mounted on the frame 102 to cover one eye of a viewer when the viewer wears the frame 102. The first optical filter 104 resolves electromagnetic radiation into a sequence of resolved polarization components so the viewer can view the sequence of resolved polarization components.

Preferably, the frame 102 includes glasses 106. The first optical filter 104 is mounted on the glasses 106 to cover one eye of the viewer when the viewer wears the glasses 106. The apparatus 100 preferably also includes a second optical filter 108 mounted on the glasses 106 to cover a second eye of the viewer when the viewer wears the glasses 106. Each optical filter resolves electromagnetic radiation into a sequence of resolved polarization components so the viewer can view the sequence of resolved polarization components.

The apparatus 100 preferably also includes a driver 18 connected to the first and second optical filters. The driver 18 produces a filter synchronization signal which is provided to the first and second optical filters to cause them to produce a sequence of resolved polarization components. Preferably, the driver 18 has an internal clock 110 which is used to modulate an AC voltage to produce the filter synchronization signal to cause the optical filters to produce the sequence of resolved polarization components. The driver 18 can include a dip switch 112 which can be varied by the viewer to change timing of the internal clock 110. The first and second optical filters are preferably of the same design and operation as described above for the optical filter 12.

Figure 4:
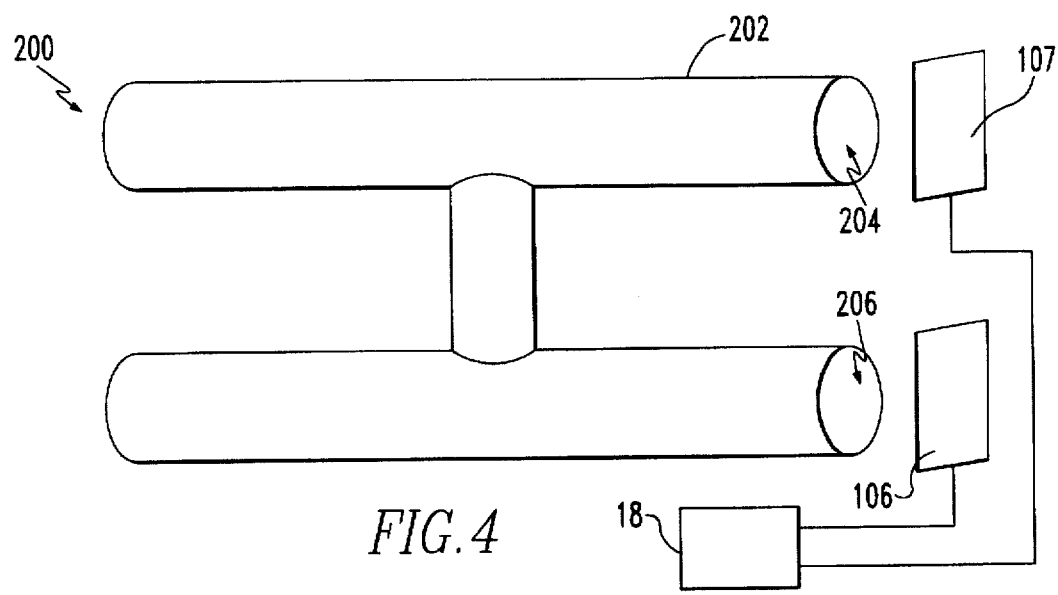
FIG. 4 is a schematic representation of binoculars of the present invention.

The present invention as shown in FIG. 4 also pertains to an apparatus 200 for viewing. The apparatus 200 is comprised of a housing 202. The apparatus 200 also includes at least a first lens 204 disposed in the housing 202 through which a viewer looks to aid vision of the viewer. The apparatus 200 is also comprised of a first optical filter 104 attached to the housing 202 and adjacent the lens 204 so light passing through the lens 204 essentially passes through the first optical filter 104. The first optical filter 104 resolves electromagnetic radiation into a sequence of resolved polarization components so the viewer can view the sequence of resolved polarization components. Preferably, the apparatus 200 includes a driver 18 connected to the first optical filter 104 which produces a first synchronization signal which is provided to the first optical filter 104 to cause the first optical filter 104 to produce the sequence of resolved polarization components.

The apparatus 200 preferably includes a second lens 206 adjacent the first lens 204 and disposed in the housing 202. The first and second lens and housing together form binoculars 208. The apparatus 200 preferably also includes a second optical filter 108 attached to the housing 202 and adjacent the second lens 206 so light passing through the second lens 206 essentially passes through the second optical filter 108. Each optical filter resolves electromagnetic radiation into a sequence of resolved polarization components so the viewer can view the sequence of resolved polarization components. Preferably, the driver 18 is connected to the first and second optical filters and produces a filter synchronization signal which is provided to the first and second optical filters to cause them to produce a sequence of resolved polarization components.

The present invention also pertains to a method for interpreting a scene. The method comprises the steps of resolving electromagnetic radiation of the scene into a sequence of resolved polarization components so elements of the scene having partial polarization will scintillate when the sequence of resolved polarization components are viewed. Then there is the step of viewing the sequence of polarization components. Preferably, before the resolving step, there is the step of placing preformed polarization encoded objects 28 into the scene. Preferably, after the viewing step, there can be the step of storing the sequence of polarization components.

Figure 1:
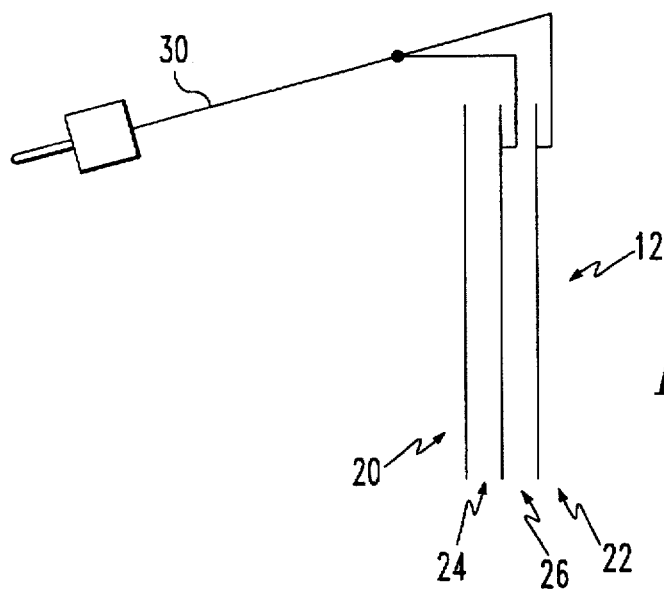
FIG. 1 is a schematic representation of an optical filter of the present invention.

In the operation of the invention, FIG. 1 shows a Liquid Crystal/Polarizer Optical Filter 12 consisting of the following components: two Twisted Nematic Liquid Crystals 24, 26 (e.g., 45° and 90° twist) and a linear polarizer 20. (A variation of this optical filter could use in place of the Twisted Nematic liquid crystals 24, 26, any other type of liquid crystal, but this is currently the preferred mode.) A video jack 30 connected to the liquid crystals goes into an electronic driver 18. The switching of the liquid crystals 24, 26 in front of the linear polarizer 20 can resolve up to 4 distinct components of polarization. This liquid crystal optical filter 12 can be used with any type of imaging device 14 as long as the switching of the liquid crystals 24, 26 is in synchronization with the imaging device 14.

In FIG. 1, the specific liquid crystal optical filter 12 consists of two twisted nematic liquid crystals 24, 26 placed in series. Each twisted nematic liquid crystal consists of helical molecules between two alignment layers. Each of the alignment layers are at opposite sides of the liquid crystal cell (i.e., on the side of the conductive glass that faces inside the liquid crystal cell). Each alignment layer has a particular orientation, the difference in orientation between each alignment layer going from one side of the liquid crystal cell to the other is how the twisted nematic molecules "twist".

For optimal performance when measuring polarization using two such liquid crystal cells in series, the alignment layers must be parallel for adjacent sides of two liquid crystal cells put together. The transmission axis of the polarizing filter should be parallel to the alignment layer of the liquid crystal cell it is adjacent to. See "Introduction to Liquid Crystals", Priestly et al., Plenum Press, 1975 N.Y. and London, incorporated by reference.

FIG. 2 shows an apparatus 10 comprising the liquid crystal polarizer optical filter 12 mounted on an imaging device 14 that internally stores images. The liquid crystal optical filter 12 switches in synchronization with the imaging device 14 so images that are stored are sensed by the imaging device 14 when the liquid crystals 24, 26 are in a relaxed state. Polarization component image sequences are stored by the imaging device 14 (e.g., on video tape for a Camcorder, in internal memory or disk for a still video camera). These polarization image sequences can be subsequently transferred to a processing device (e.g., digitizing from video tape to memory storage on a processing device, or, directly transferring from internal memory of the imaging device to internal memory on a processing device). The polarization component images can then be processed as described in U.S. patent application Ser. No. 07/968,175, incorporated by reference.

In FIG. 2, the electronic driver 18 strips the sync pulse from the video synchronization signal of the imaging device 14, and uses this sync pulse as the timing for switching the liquid crystal optical head to form a filter synchronization signal. The driver 18 modulates an AC voltage of +−9 volts (the driver 18 runs off a 9 volt battery). The optimum AC frequency for twisted nematic liquid crystals 24, 26 has been found to be about 700HZ. When this is modulated OFF the liquid crystal 24, 26 twists by n degrees (we use 45 and 90 degree crystals). When it is modulated ON the liquid crystal 24, 26 twists by 0 degrees. Modulation produces the sequence of 0, 45 and 90 degree twist states between the series of two liquid crystals 24, 26, the time duration of these states being multiples of the basic video frametime rate of the imaging device 14 (determined by the sync pulse, e.g., NTSC frametime rate is 1/30 second). The video multiple frametime rate can be varied by a dip switch 112 on the electronic box by the user.

The sequence of polarization component images taken by an imaging device 14, like in FIG. 2, can be of use by itself. Elements of a scene with significant partial polarization will "flash" or "scintillate" in a sequence of polarization components emphasizing potentially important parts of the scene. Both the magnitude of the amount which these elements "scintillate" from light to dark (dependent upon the amount of partial polarization), and the sequence in which the scintillation varies in brightness (dependent upon the orientation of the linear polarized component) can reveal important information about a scene. There need not even be an imaging device at all—this succession of resolved polarization components can be viewed by the naked eye through glasses 106 (FIG. 3) or with magnification through binoculars 208 (FIG. 4) shown with liquid crystal/polarizer optical filter heads mounted on these instruments. Applications: the embodiments shown in FIGS. 3 and 4 can aid soldiers in picking out manmade objects (tanks, trucks, buildings, etc.) embedded in heavily camouflaged terrain, or, picking out a potential sniper. They can also aid in inspecting materials for defects.

In FIGS. 3 and 4, the speed at which the AC voltage is modulated is not determined by a sync pulse. But the speed at which AC voltage is modulated (i.e., correspondingly the rate at which the liquid crystals 24, 26 switch) can be determined by an internal clock 110 inside the driver 18. This can be controlled by the user with an attached dip switch 112 (i.e., the rate at which the liquid crystals 24, 26 switch can be varied by the user).

Elements of a scene can be intentionally polarization encoded so that humans using devices shown in FIGS. 2, 3 and 4 can properly identify parts of a scene using the "scintillating" polarization information which is stealthed to normal human observation. An important example is placing polarizing material on troops, or on combat vehicles, to potentially reduce chances of casualties due to friendly fire—without the apparatuses in FIGS. 2, 3 or 4 the enemy will not be able to observe any difference. Another example is polarization encoding light beacons on a secret landing strip that only pilots with these polarization devices could properly observe. A commercial application is to place polarization pattern markers on items for validation such as credit cards or even money—to the naked eye the item would not look unusual, however with the apparatuses shown in FIGS. 2, 3 and 4, normally stealthed polarization patterns can be observed. Not just spatial patterns of extincted and partially extincted, but the order in which they extinct relative to one another.

There are already companies such as Frank Wooley, Inc., Reading, Pennsylvania, that imprint polarization patterns onto material for the purpose of animation for advertising on Billboards. Such polarization patterns can be used in the same way holograms are used to validate credit cards except that the devices described in FIGS. 2, 3 and 4 need to be utilized to discern these polarization patterns.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for viewing a scene comprising:
   an optical filter having a polarizer with a fixed axis which resolves electromagnetic radiation into a sequence of resolved polarization components; and
   an imaging device having a storage device, said imaging device disposed adjacent to and on only one side of the optical filter to receive the sequence of resolved polarization components from the optical filter and store them in the storage device for subsequent processing.

2. An apparatus as described in claim 1 wherein the imaging device is a camcorder and the storage device is a videotape in the camcorder.

3. An apparatus as described in claim 1 wherein the imaging device is a still video camera and the storage device is an internal memory or a disk.

4. An apparatus as described in claim 1 wherein the imaging device produces a video synchronization signal; and including a driver connected to the imaging device and the optical filter which receives the video synchronization signal and produces a filter synchronization signal which is provided to the optical filter for causing the optical filter to produce the sequence of resolved polarization components so the optical filter is in synchronization with the imaging device so images are stored by the imaging device at a proper time.

5. An apparatus as described in claim 4 wherein the optical filter comprises a polarizer; and a polarizer; and a mechanism for steering a polarization plane of the radiation, said steering mechanism disposed such that radiation passing through the polarizer first passes through the steering mechanism.

6. A filter as described in claim 5 wherein the polarizer is a fixed linear polarizing.

7. An apparatus as described in claim 6 wherein the steering mechanism includes a first twist crystal and at least a second twist crystal aligned with said first twist crystal such that radiation passing through the first crystal then passes through the second crystal, each crystal having a first state and a second state, said first state uneffecting the polarization plane of the radiation as the radiation passes through the crystal, said second state rotating the polarization plane of the radiation as the radiation passes through the crystal; and wherein the driver controls the state of each crystal in conjunction with the imaging device.

8. An apparatus as described in claim 7 wherein each second state rotates the polarization plane of radiation passing through the first or second crystal 45°.

9. An apparatus as described in claim 8 wherein the driver controls the states of the crystals such that the polarization plane of radiation over time passing through the crystals experiences sequential rotation of 0°, 45°, 90° and 135° to create the sequence of resolved polarization components.

10. An apparatus as described in claim 9 wherein the driver maintains the crystals at a given state for four frame times of the imaging device such that the rotation of the polarization plane experiences the rotation of 0°, 45°, 90 and 135 as the state of the crystals are changed.

11. An apparatus as described in claim 10 wherein the driver modulates an AC voltage based on the video synchronization signal to produce the filter synchronization signal.

12. An apparatus as described in claim 9 wherein the driver modulates an AC voltage to produce the filter synchronization signal that maintains the crystals at a given state for time durations that are multiples of a basic video framerate of the imaging device.

13. An apparatus as described in claim 1 wherein the imaging device measures polarization states of the sequence of resolved polarization components and stores the measured polarization states to form the images.

14. An apparatus as described in claim 1 including preformed polarized objects disposed in the scene which scintillate when an image from the sequence of resolved polarization components is formed.

15. An apparatus for viewing comprising:
a frame; and
a first electro-optically controlled optical filter mounted on the frame to cover one eye of a viewer when the viewer wears the frame, said first optical filter resolving electromagnetic radiation into a sequence of resolved polarization components so the viewer can view the sequence of resolved polarization components.

16. An apparatus as described in claim 15 wherein the frame includes glasses, wherein the first optical filter is mounted on the glasses to cover one eye of the viewer when the viewer wears the glasses, and including a second electro-optically controlled optical filter mounted on the glasses to cover a second eye of a viewer when the viewer wears the glasses, each optical filter resolves electromagnetic radiation into a sequence of resolved polarization components so the viewer can view the sequence of resolved polarization components.

17. An apparatus as described in claim 16 including a driver connected to the first and second optical filters which produces a filter synchronization signal which is provided to the first and second optical filters to cause them to produce the sequence of resolved polarization components.

18. An apparatus as described in claim 17 wherein the driver has an internal clock which is used to modulate an AC voltage to produce the filter synchronization signal to cause the optical filters to produce the sequence of resolved polarization components.

19. An apparatus as described in claim 18 wherein the driver includes a dip switch which can be varied by the viewer to change timing of the interval clock.

20. An apparatus for viewing comprising:
a housing;
at least a first lens disposed in the housing through which a viewer looks to aid vision of the viewer; and
a first optical filter attached to the housing, adjacent to and on only one side of the lens so light passing through the lens essentially passes through the first optical filter, said first optical filter resolves electromagnetic radiation into a sequence of resolved polarization components so the viewer can view the sequence of resolved polarization components.

21. An apparatus as described in claim 20 including a driver connected to the first optical filter which produces a filter synchronization signal which is provided to the first optical filter to cause the first optical filter to produce the sequence of resolved polarization components.

22. An apparatus as described in claim 21 including a second lens adjacent the first lens and disposed in the housing, the first and second lens and housing forming binoculars, and a second optical filter attached to the housing and adjacent the second lens so light passing through the second lens essentially passes through the second optical filter, each optical filter resolves electromagnetic radiation into a sequence of resolved polarization components so the viewer can view the sequence of resolved polarization components; and wherein the driver is connected to the first and second optical filters and produces a filter synchronization signal which is provided to the first and second optical filters to cause them to produce the sequence of resolved polarization components.

23. A method for interpreting a scene comprising the steps of:
resolving electro-optically electromagnetic radiation of the scene into a sequence of resolved polarization components so elements of the scene having partial polarization will scintillate when the sequence of resolved polarization components are viewed; and
viewing the sequence of polarization components.

24. A method as described in claim 23 including before the resolving step, there is the step of placing preformed polarization encoded objects into the scene.

25. A method as described in claim 24 including after the viewing step, there is the step of storing the sequence of polarization components.

26. An apparatus for viewing comprising:
a support;
a polarizer mounted on a support; and
a mechanism for steering the polarization plane of light radiation mounted on a support, said steering mechanism disposed such that radiation passing through the polarizer first passes through the steering mechanism, said polarizer on only one side of the steering mechanism, the support, polarizer and steering mechanism together disposed for use to directly view resolved polarization components from a scene.

27. An apparatus as in claim 26 with the polarizer and steering mechanism are mounted together to form a single optical filter unit.

28. An apparatus as described in claim 26 including:
a second support;
a second polarizer mounted on a second support; and
a second mechanism for steering the polarization plane of light radiation mounted on a second support, said steering mechanism disposed such that radiation passing through the second polarizer first passes through the second steering mechanism, the second support, second polarizer and second steering mechanism together disposed for use to directly view resolved polarization components from a scene, each polarizer disposed so as to be viewed respectively by each eye of a viewer.

29. An apparatus as described in claim 26 wherein the support is wearable by the viewer.

30. An apparatus as described in claim 26 wherein the steering mechanism is connected to an electronic circuit which controls the angle of the steering mechanism corresponding to the angle by which the plane of polarization of light is rotated when passed through the steering mechanism; each angle of the steering mechanism in conjunction with the polarizer producing a resolved polarization component of electromagnetic radiation after passing through the polarizer.

31. An apparatus as described in claims 30 wherein the steering mechanism being controlled by the electronic circuit is placed in a sequence of at least two steering angles each steering angle maintained for a certain amount of time.

32. An apparatus as described in claim 31 wherein the electronic circuit controlling the steering mechanism in turn can be controlled by the user using buttons and/or switches to select the amount of time that a particular steering angle is maintained during a sequence of steering angles.

33. An apparatus as described in claim 26 wherein the polarizer is a fixed linear polarizer.

34. An apparatus as described in claim 33 wherein the steering mechanism includes at least one twisted nematic liquid crystal with a twist angle ml, this twisted nematic liquid crystal capable of being electrically switched to produce either steering angles 0 degrees or ml degrees.

35. apparatus as described in claim 34 wherein any number, s>1, of twisted nematic liquid crystals, each with respective twist angles mi, i=1,2, ... s, are arranged in series so that radiation passing through the kth crystal has already passed through crystals i<k; these crystals can be electrically switched to produce steering angles 0 degrees or the addition of any subset of the numbers mi degrees.

36. An apparatus as described in claim 26 further including an object disposed in the scene with preformed polarization characteristics when light radiation is reflected from or transmitted through the object, causing the object to scintillate or causing intensity or color patterns to animate across the object when viewed through the apparatus.

37. An apparatus as in claim 36 wherein the object disposed in a scene which includes as a preformed polarization characteristic a material that linear polarizes electromagnetic radiation upon transmission or reflection.

38. An apparatus as in claim 37 wherein the object disposed in a scene which includes a material with preformed spatially varying orientation axis of linear polarizing material; the linear polarizing material producing at any point an orientation of linear polarization upon transmission or reflection of electromagnetic radiation.

39. A method for interpreting a scene comprising the steps of:

resolving electromagnetic radiation of the scene into a sequence of polarization components so elements of the scene having partial polarization will scintillate when the sequence of polarization components are viewed; and viewing the sequence of polarization components.

40. A method as described in claim 39 including before the step of resolving electromagnetic radiation, there is the step of intentionally placing an object disposed in the scene with preformed polarization characteristics when electromagnetic radiation is reflected from or transmitted through the object, for encoding parts of the scene.

41. A method as described in claim 40 including after the viewing step, there is the step of storing the sequence of polarization components.

* * * * *